J. Bell,
Nut Lock.
No. 107,938.      Patented Oct. 4, 1870.
fig. 3
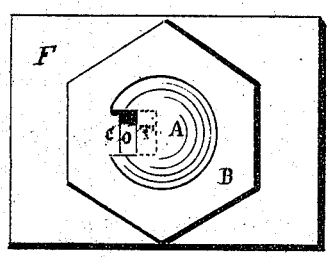
fig. 4
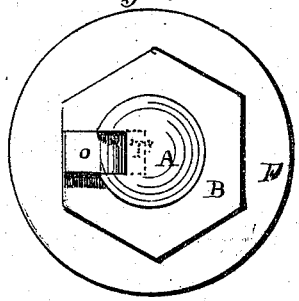
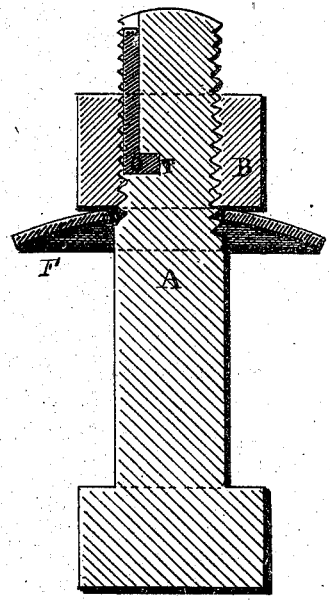
fig. 1
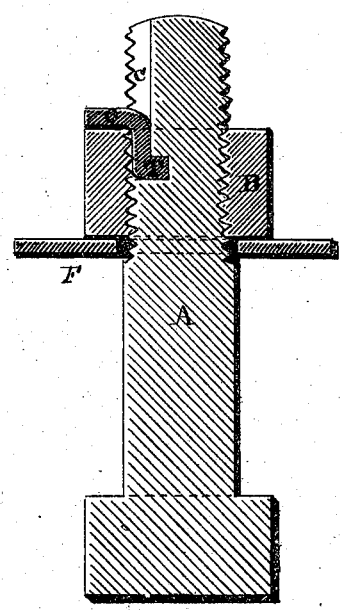
fig. 2
Witnesses.
C. G. Hubert
L. G. Hubert
Inventor.
Jon.ᵃ Bell
by W. Gingenguibre Hubert.
Atty —

UNITED STATES PATENT OFFICE.

JONATHAN BELL, OF NEW YORK, N. Y.

IMPROVEMENT IN NUT-LOCKS.

Specification forming part of Letters Patent No. 107,998, dated October 4, 1870.

*To all whom it may concern:*

Be it known that I, JONATHAN BELL, of the city, county, and State of New York, have invented certain Improvements in Locks for Nuts, of which the following is a specification:

This invention relates to hooks or devices for keeping a nut from being slackened or becoming loose spontaneously; and it consists in the employment of an anchor of compound metal, used in combination with a slot and cavity in the cylindrical part of the bolt, whereby the nut is secured on the bolt.

Figure 1 is a sectional view of a bolt, nut, and washer, with my improved anchor nut-lock attached, through the line $x\ x$. Fig. 2 is a sectional view through $x'\ x'$ of Fig. 4. Fig. 3 is a top view of a bolt, nut, and washer, with my compound anchor-lock attached. Fig. 4 is a similar view, also, of a bolt, nut, and washer, with my improvement attached, and locked or clinched.

A is a bolt of any kind, having a nut, B, running upon it in the ordinary manner.

C is a longitudinal slot or groove cut, pressed, or stamped in upon that part of the bolt where the thread is cut, and having the enlarged cavity T either made deeper or wider than the said slot C, at the end thereof nearest to the head of the bolt.

Instead of making the slot C parallel to the length of the bolt, it may be made either in a spiral form or of an irregular zigzag shape, to answer the purpose of anchoring the piece or bar O, (which is then made to conform thereto,) without having the head T.

O is an anchor or clamp, made of compound metal, say of zinc, tin and copper, zinc and copper, lead and tin, or any other suitable combination of metals, to obtain an alloy which will not have a galvanic action with the bolt.

This anchor O is placed in the slot C, so as to fill it, and be hooked or anchored in the cavity T, and the nut B may be screwed over it freely, as indicated in Figs. 1 and 3.

When the nut is screwed home, the end of the anchor which projects out of the nut is turned or jammed up against the same, as seen in Figs. 2 and 4, thus preventing the nut receding on the bolt.

In order to take up any slack which may arise from wear of surfaces in railroad-work, I employ, in connection with my anchor, a spring-washer, F, which is seen at rest in Fig. 1, and straightened in Fig. 2.

This nut-lock and washer combined is specially designed for use on railroad tracks, cars, and wheeled vehicles, and on machinery where the jarring or rubbing movement tends to loosen and shake off or slacken the nuts of bolts, it being found absolutely impossible to tighten nuts to bearings by the simple bolt and nut, in positions subjected to frequent jarrings, as to entirely prevent slack by rubbing, or to meet the exigencies of climatic construction.

I adapt for my key or anchor any of the mixture of the metals named herein, to obtain a tough and pliable bar, and one least liable to the contingency of galvanic action, when in contact with iron in wet or damp situations.

I am aware that bolts have been made with a key-seat cut into the part which is threaded, and also that a soft metal key has been used therein, so that the nut, on being screwed on, will cut a thread into said soft metal key, and this I do not claim; but What I do claim, and desire to secure by Letters Patent of the United States, is—

The combination of a bolt, A, having the slot C and enlarged cavity T, with the anchor O, the whole arranged so as to operate in the manner and for the purpose set forth.

JONA. BELL. [L. S.]

Witnesses:
A. GENGEMBRE HUBERT,
MAURICE V. J. SAND.